United States Patent [19]

Zahradnik

[11] Patent Number: 4,913,641

[45] Date of Patent: Apr. 3, 1990

[54] PREHEATING AND FEEDING APPARATUS FOR AN EXTRUDER

[75] Inventor: Rudolf Zahradnik, Vienna, Austria

[73] Assignee: TET Holding Ges.m.b.H, A-Korneuburg, Austria

[21] Appl. No.: 256,913

[22] Filed: Oct. 12, 1988

[30] Foreign Application Priority Data

Oct. 12, 1987 [AT] Austria ............................... 2681/87

[51] Int. Cl.⁴ .............................................. B29C 47/40
[52] U.S. Cl. .................................. 425/204; 264/211.23; 366/147; 425/205; 425/208; 425/378.1
[58] Field of Search ................ 425/204, 208, 378.1, 425/205; 264/211.21, 211.23; 366/85, 147

[56] References Cited

U.S. PATENT DOCUMENTS

| | | |
|---|---|---|
| 2,543,307 | 2/1951 | Swallow et al. ...................... 366/85 |
| 3,310,836 | 3/1967 | Nichols .......................... 366/147 X |
| 3,884,607 | 5/1975 | Gerhards ......................... 366/85 X |
| 4,067,553 | 1/1978 | Yamaoka ....................... 366/147 X |
| 4,082,488 | 4/1978 | Brinkschroder et al. ............ 425/204 |
| 4,416,543 | 11/1983 | Brinkmann ..................... 425/204 X |
| 4,501,498 | 2/1985 | McKelvey ...................... 425/204 X |
| 4,802,140 | 1/1989 | Dowling ......................... 425/204 X |

*Primary Examiner*—Richard L. Chiesa
*Attorney, Agent, or Firm*—Herbert Dubno

[57] ABSTRACT

A preheater and feeder for thermoplastifiable material supplied to an extruder for synthetic resin has the counterrotating worms in a heated housing delivering the material at a rate determined by the worm speeds. The worms are hollow and the major portion of the heat, apart from friction heat, contributed to the material is delivered by passing a heating fluid through the hollow worms.

3 Claims, 2 Drawing Sheets

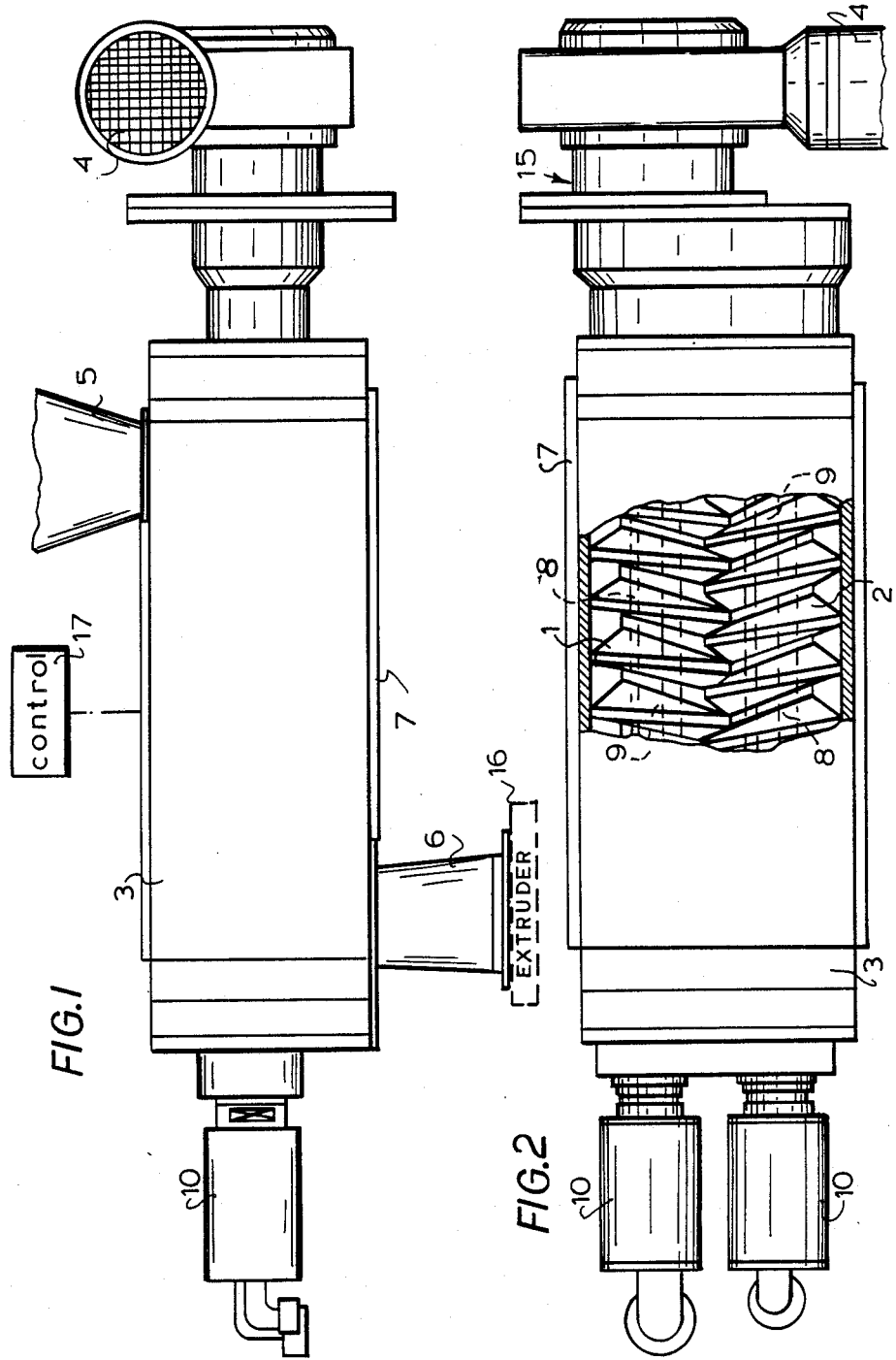

PREHEATING AND FEEDING APPARATUS FOR AN EXTRUDER

FIELD OF THE INVENTION

My present invention relates to a preheating and feeding apparatus or device for supplying an extruder with a plastifiable synthetic resin, especially a synthetic resin having elastomer properties and which can serve to preheat the powder and subject it to homogenization and possibly preliminary plastification before the synthetic resin material is metered into the extruded.

More particularly, the invention relates to a worm-type device which can be used for the preheating and metering of such synthetic resins as polyvinylchloride and like thermoplastic materials, and also for elastomeric materials upstream of an extruder to feed the material in the form of powder, scrap, granulate, mixtures thereof and the like to the extruder in a preheated and, if desired, preplastified and homogenized state.

BACKGROUND OF THE INVENTION

It has been proposed to provide the thermoplastifiable material which is to be subjected to extrusion in a worm-type extrusion press, to preheating before this material is admitted to the extruder and thereby contribute to the material some of the heat required for the plastification.

Such techniques permit the output of an extrusion press to be increased or the extrusion press to be better utilized.

The charging or metering device may also be utilized to ensure an exact rate of feed of the material to the extrusion press and thereby maintain an output which is at or close to maximum without danger of overloading the extrusion press and when a portion of the heat is contributed by the charging device, permitting control of the temperature within the press by ensuring that the material will enter with a certain preheat temperature.

The preheating and charging device must be designed, therefore, to be capable of preheating the material, feed the material with precision and, above all, to ensure a uniform temperature of the preheated material fed to the extrusion press.

In other words, temperature differences within the synthetic resin material to be processed should be avoided as much as possible and the material should be able to be brought to a temperature close to that at which the material becomes sticky and plastifiable.

When these conditions can be maintained, it is also necessary to ensure that the material can be fed to a given extrusion press without significant modification thereof and with precise control of the feed rate and the preheating temperature, so that the production of thermoplastic products with the sharply varying characteristics due to preheating temperature fluctuations, temperature differences in the preheated material and variations in the feed rate can be avoided.

It has been proposed to provide a charging device for an extrusion press which comprises at least two worms journaled in a heated housing.

The first worm carries the material out of a feed funnel while the second worm delivers the material to the extruder feed passage. The device is designed so that particles of material are carried through both worms a plurality of times. This known arrangement with lateral preheating and material circulation allows preheating of the material practically independently of the volume rate of feed thereof but has the drawback that the material is not uniformly heated. In addition, this worm preheater has the disadvantage that a metering device is required between the preheater and the extrusion press.

OBJECTS OF THE INVENTION

It is the principal object of the present invention to provide an improved preheating and feed device which will avoid the aforedescribed drawbacks and disadvantages.

Another object of this invention is to provide a preheater and feeder for metering preheated thermoplastifiable material to an extrusion press which can be utilized for elastomers as well as thermoplastics.

It is also an object of this invention to provide an improved preheater and metering device which can ensure a uniform heating of the thermoplastifiable material as well as an accurate metering of the material to the extrusion press.

SUMMARY OF THE INVENTION

These objects and others which will become apparent hereinafter are attained, in accordance with the present invention by providing a double-worm feeder having a heated housing so that both of the worms are hollow and serve in part to deliver heat to or control the heating of the thermoplastifiable material.

More particularly, the preheater and feeder for an extruder operating with a thermoplastifiable material comprises:

an elongated housing;

a pair of interfitting counterrotating hollow worms journaled at opposite ends in the housing for advancing a thermoplastifiable synthetic resin along the housing while heating same;

inlet means for feeding the thermoplastifiable material to the housing for entrainment by the worms;

outlet means for connecting the housing to an extruder for the thermoplastifiable synthetic resin to receive the thermoplastifiable synthetic resin from the worms; and means for heating the housing for at least in part heating the thermoplastifiable synthetic resin as it is advanced from the inlet means to the outlet means.

In particular, I provide means for passing a heating fluid through each of the hollow worms, this means including a respective pipe extending into each worm from one end thereof and terminating short of an opposite end of the respective worm, each of the worms having a hollow interior thereof receiving the respective pipe with all-around clearance and being closed at the respective opposite end, and each of the pipes has a diameter less than a diameter of the respective hollow interior and communicates with the hollow interior so that the heating fluid travserses each pipe and the respective hollow interior.

In this manner it is possible to heat the thermoplastifiable material not only through the housing wall but also through and by means of the worms.

Since the material is advanced forceably by the counter-rotating worms, it is possible to ensure that the material will be heated to comparatively high temperatures without blocking of the advance of the material and hence at a precise feed rate.

The control of the rotating speeds of the two worms can be effected by regulating the speed of the motor driving the worms to achieve an exact metering of the material to the extruder. The interposition of a separate metering device is therefore not required.

Advantageously, the heat exchange through the hollow worms is effected by delivery to the heating fluid through the pipes whose diameter is less than that of the hollow space through which the pipe extends so that an all-around clearance is provided between each pipe and the inner wall of the hollow worm. The heating fluid fed to the two worms is preferably hot water.

The heating of the material in the feeder is contributed by friction in an amount of 25 to 30% of the heat required and this portion, of course, is contributed by the joule effect of the drive. The greater part of the balance of the heat contribution is provided through the worms while a minor proportion of the balance of the heat can be contributed by the heated housing which can have its temperature accurately controlled and varied.

BRIEF DESCRIPTION OF THE DRAWING

The above and other objects, features and advantages of the present invention will become more readily apparent from the following description, reference being made to the accompanying drawing in which:

FIG. 1 is a side elevational view of a preheating device according to the invention;

FIG. 2 is a plan view of the device, partly broken away; and

SPECIFIC DESCRIPTION

Figure 3:
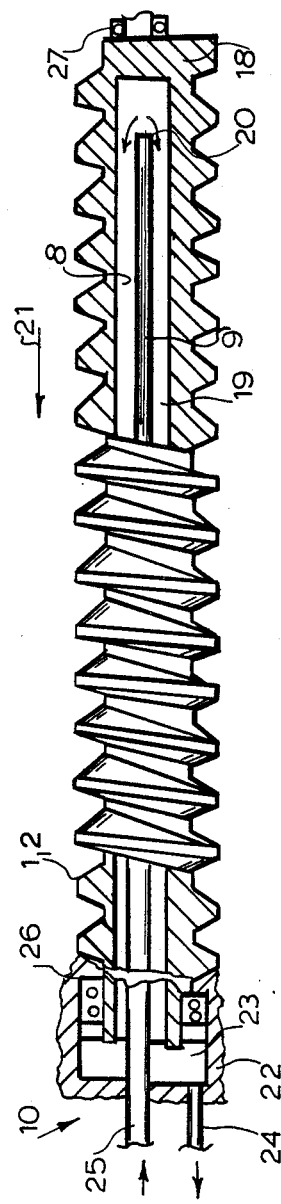
FIG. 3 is an elevational view, partly in section, of a worm and associated parts of the device shown in highly diagrammatic form.

In the drawing, I have shown a preheating and metering device which has two worms 1 and 2 which are designed to form a counter-rotating double-worm feeder within the housing 3.

The housing 3 journals the worms at their opposite extremities.

The two worms are driven in opposite senses by a motor 4 via a transmission shown at 15. At the upstream end of the feed path defined by the two worms, 1, 2, I have provided an inlet funnel 5 for the thermoplastifiable material.

At the downstream end of this path, a connecting fitting 6 is provided to deliver the material to the extruder 16.

The housing 3 is provided with a heating jacket 7 through which a heating fluid can be circulated or which may have an electrical heating jacket and can be controlled as represented by the box 17.

Each of the worms 1 and 2 has a hollow space 8 extending through the interior thereof and closed at 18 at one end.

In each hollow space 8, a pipe 9 extends axially so that a clearance 19 is provided around each pipe 9 within the hollow worm.

The pipes 9 terminate at 20 slightly upstream with respect to the direction of flow of thermoplastifiable material along the worm (arrow 21) so that the hot water can flow in the direction of arrow 21 through the clearing 19.

At the downstream end of the worm, each pipe 9 is provided with connecting fittings 10 for supplying the hot water and removing the water circulated through the hollow worm. In FIG. 3 such means is shown diagrammatically as a housing 22 with respect to which the worm is rotatable and forming a chamber 23 into which the water is discharged from the worm, this chamber communicating with a pipe 24. The pipe 9 is held stationary and has a fitting 25 to which the hot water is fed.

The worm 1 or 2 is journaled in bearings 26 and 27 at its opposite ends in the housing 3.

Hot water traversing the pipes 9 and then passing through the annular clearances 19 thus heats each worm and this heating is transferred to the thermoplastifiable material. The return flow is thus through the clearance.

I claim:

1. An apparatus for extrusion, comprising:
   an extruder operating with a thermoplastifiable synthetic resin; and
   a preheater and feeder having an inlet receiving said synthetic resin and an outlet communicating in said extruder for feeding preheated synthetic resin in said extruder, said preheater and feeder comprising:
   an elongated housing formed with said inlet at one end of said housing and with said outlet at an opposite end thereof,
   a pair of interfitting counterrotating hollow worms journaled at opposite ends in said housing for advancing said thermoplastifiable synthetic resin along said housing while heating same,
   means for passing a heating fluid through each of said hollow worms,
   said means for passing a heating fluid through each of said hollow worms including a respective pipe extending into each worm from one end thereof and terminating short of an opposite end of the respective worm, each of said worms having a hollow interior thereof receiving the respective pipe with all-around clearance and being closed at the respective said opposite end, each of said pipes having a diameter less than a diameter of the respective hollow interior and communicating with said hollow interior so that said heating fluid traverses each pipe and the respective hollow interior;
   respective bearings at each of the ends of said worms respectively, journaling said worms in said housing at the respective ends, and
   means for heating said housing for at least in part heating said thermoplastifiable synthetic resin as it is advanced from said inlet means to said outlet means.

2. The apparatus defined in claim 1 wherein in said preheater and feeder, said means for passing a heating fluid through each of said hollow worms includes means for feeding hot water to each of said pipes and for removing water from the respective hollow interiors at an end of each of said worms proximal to said outlet.

3. The apparatus defined in claim 1 wherein said preheater and feeder has drive means operatively connected to said worms proximal to at said other ends thereof said inlet for rotating said worms in opposite senses.

* * * * *